W. LYON.
NUT-LOCKS.
No. 195,516. Patented Sept. 25, 1877.
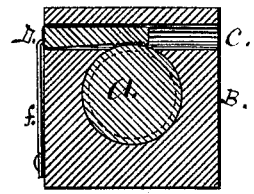
Witness
A. L. Cross
Chas. P. Ross
Inventor
William Lyon
By Horace Harris atty

UNITED STATES PATENT OFFICE.

WILLIAM LYON, OF NEWARK, NEW JERSEY.

IMPROVEMENT IN NUT-LOCKS.

Specification forming part of Letters Patent No. 195,516, dated September 25, 1877; application filed March 10, 1877.

*To all whom it may concern:*

Be it known that I, WILLIAM LYON, of Newark, in the county of Essex and State of New Jersey, have invented a new Improvement in Nut-Locks, which improvement is fully set forth in the following specification and accompanying drawings, in which the figure is a cross-section, showing the relation and operation of the locking device.

The object of my invention is to provide a simple, perfect, and automatic lock for nuts of almost every variety and position, whether the nut or bolt be stationary.

In the drawing, $a$ is the bolt; B, the nut; and through one side of the nut, on a line with the face, is a hole, $c$, cutting into the screw-hole for the bolt. In this hole is placed the wedge D, having a flat surface coming next to the bolt; and this wedge will have on this flat side a serrated surface, made to bite into the bolt when in use. This wedge is kept in its place by a spring-plate, $f$, or some other device equivalent thereto; or it may be kept in position by its own gravity as well.

Thus, when the nut is turned on, the turning acts from the point of the wedge and throws it up; but the instant an attempt is made to reverse the motion—to turn off the nut—the wedge is pressed down and binds against the bolt, and the more the effort to work it off the more it holds.

The same device may be used to lock a check-nut on a smooth bolt.

The hole for the wedge extends through the nut, and when it is necessary to reverse the nut a pin is pushed in against the point end of the wedge, and it is pressed back, and the nut may be taken off.

I claim—

A wedge having a flat and transversely-serrated surface, in combination with a nut having an aperture or recess extending from one of its sides and communicating with the bolt-hole and with an ordinary threaded bolt, substantially as and for the purpose described.

In witness of my invention I hereunto set my hand this 7th day of March, 1877.

WILLIAM LYON.

Witnesses:
   HORACE HARRIS,
   A. L. CROSS.